US012763325B2

(12) United States Patent
Takada et al.

(10) Patent No.: US 12,763,325 B2
(45) Date of Patent: Oct. 13, 2026

(54) SOLID STATE SECONDARY BATTERY AND POSITIVE ELECTRODE ACTIVE MATERIAL

(71) Applicants: Nissan Motor Co., Ltd., Yokohama (JP); Renault S.A.S., Boulogne-Billancourt (FR)

(72) Inventors: Harumi Takada, Kanagawa (JP); Kazuyuki Sakamoto, Kanagawa (JP); Naoto Saito, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 677 days.

(21) Appl. No.: 18/029,417

(22) PCT Filed: Oct. 1, 2020

(86) PCT No.: PCT/IB2020/000823

§ 371 (c)(1),
(2) Date: Mar. 30, 2023

(87) PCT Pub. No.: WO2022/069913

PCT Pub. Date: Apr. 7, 2022

(65) Prior Publication Data

US 2023/0282823 A1 Sep. 7, 2023

(51) Int. Cl.
*H01M 4/525* (2010.01)
*H01M 4/36* (2006.01)
*H01M 10/0525* (2010.01)

(52) U.S. Cl.
CPC ........... *H01M 4/525* (2013.01); *H01M 4/364* (2013.01); *H01M 10/0525* (2013.01)

(58) Field of Classification Search
None
See application file for complete search history.

(56) References Cited

U.S. PATENT DOCUMENTS

2015/0228969 A1* 8/2015 Cho ...................... H01M 4/366 429/223
2016/0006031 A1 1/2016 Kaseda et al.
(Continued)

FOREIGN PATENT DOCUMENTS

JP 2016170942 A 9/2016
WO 2013/022034 A1 2/2013
(Continued)

OTHER PUBLICATIONS

Li Qiang et al: "Realizing Superior Cycle Stability of a Ni-Rich Layered LiNi 0.83 Co 0.12 Mn 0.05 O 2 Cathode with a B 2 O 3 Surface Modification", Chemelectrochem, vol. 7, No. 4, Feb. 17, 2020 (Feb. 17, 2017), pp. 998-1006 https://chemistry-europe.onlinelibrary.wiley.com/action/showCitFormats?doi=10.1002%2Fcelc.201901991.

*Primary Examiner* — Zhongqing Wei
(74) *Attorney, Agent, or Firm* — Young Basile Hanlon & MacFarlane, P.C.

(57) ABSTRACT

The initial capacity and cycle durability are improved in a secondary battery which uses a sulfide solid electrolyte containing sulfur and phosphorus and high nickel-type positive electrode active material. In the secondary battery having a power generating element containing, laminated in this order, a positive electrode with a positive electrode active material layer containing a positive electrode active material composed of a so-called high nickel-type lithium-containing composite oxide, an electrolyte layer which contains a sulfide solid electrolyte containing sulfur and phosphorus, and a negative electrode with a negative electrode active material layer containing a negative electrode active material, one or more added element selected from the group consisting of B, P, S and Si is made to be present in a molar concentration larger than that of Ni, into a surface layer (Continued)

region having a depth within 100 nm from the surface of a particle of the lithium-containing composite oxide.

11 Claims, 3 Drawing Sheets

(56) References Cited

U.S. PATENT DOCUMENTS

| | | | | |
|---|---|---|---|---|
| 2016/0268586 | A1* | 9/2016 | Kawakami | H01M 4/62 |
| 2020/0313180 | A1* | 10/2020 | Ryoshi | H01M 4/505 |

FOREIGN PATENT DOCUMENTS

| | | | |
|---|---|---|---|
| WO | 2014133064 | A1 | 9/2014 |
| WO | 2015/050031 | A1 | 4/2015 |
| WO | 2019/039566 | A1 | 2/2019 |

* cited by examiner

10

SOLID STATE SECONDARY BATTERY AND POSITIVE ELECTRODE ACTIVE MATERIAL

TECHNICAL FIELD

The present invention relates to a secondary battery.

BACKGROUND

In recent years, in order to fight global warming, there is a strong need for reduction of the amount of carbon dioxide. In the automobile industry, there are increasing expectations for a reduction of carbon dioxide emissions by introduction of electric vehicles (EV) and hybrid electric vehicles (HEV), and development of non-aqueous electrolyte secondary batteries such as secondary batteries for motor driving, which are key to practical application of such vehicles, has been actively conducted.

A secondary battery for motor driving is required to have extremely high output characteristics and high energy as compared with a lithium-ion secondary battery for consumer use used in a mobile phone, a notebook computer, and the like. Therefore, a lithium-ion secondary battery having the highest theoretical energy among all practical batteries has attracted attention, and is currently being rapidly developed.

Here, lithium-ion secondary batteries that are currently widespread use a combustible organic electrolyte solution as an electrolyte. In such liquid-based lithium-ion secondary batteries, safety measures against liquid leakage, short circuit, overcharge, and the like are more strictly required than other batteries.

Therefore, in recent years, research and development on an all-solid battery such as an all-solid lithium-ion secondary battery using an oxide-based or sulfide-based solid electrolyte as an electrolyte have been actively conducted. The solid electrolyte is a material mainly made of an ion conductor that enables ion conduction in a solid. For this reason, in an all-solid lithium-ion secondary battery, in principle, various problems caused by combustible organic electrolyte solution do not occur unlike the conventional liquid-based lithium-ion secondary battery. In general, use of a high-potential and large-capacity positive electrode material and a large-capacity negative electrode material can achieve significant improvement in output density and energy density of a battery.

Meanwhile, in an all-solid lithium-ion secondary battery using a sulfide solid electrolyte in combination with a positive electrode active material composed of a metal oxide, problems such as an increase in battery resistance and a decrease in output characteristics of the all-solid battery may occur, due to low electron conductivity of the metal oxide. Further, when a conductive material is added to deal with such problems, the content of the positive electrode active material is relatively decreased, and this results in a decrease in the energy density of the battery.

To suppress the occurrence of such problems, for example, WO 2013/022034 A discloses a technique in which a reaction-inhibiting layer containing a carbon material and a lithium-containing oxide such as $LiNbO_3$ is formed on the surface of a composite positive electrode active material to obtain a composite positive electrode active material, thereby preventing a decrease in battery resistance of the all-solid battery and improving output characteristics.

SUMMARY

The present inventors have studied the use of a high nickel-type positive electrode active material, i.e., a high-capacity positive electrode active material, in a secondary battery which uses a sulfide solid electrolyte containing sulfur and phosphorus for an electrolyte layer. As a result, it has been found that sufficient performance cannot be obtained for the initial capacity and cycle durability. Therefore, the present inventors have attempted to improve the performance thereof using the technique described in WO 2013/022034 A mentioned above.

However, even with the technique disclosed in WO 2013/022034 A, the initial capacity and cycle durability of a secondary battery which uses a sulfide solid electrolyte containing sulfur and phosphorus and high nickel-type positive electrode active material has not been able to be sufficiently improved.

Therefore, an object of the present invention is to provide a means for sufficiently improving the initial capacity and cycle durability of a secondary battery which uses a sulfide solid electrolyte containing sulfur and phosphorus and high nickel-type positive electrode active material.

The present inventors have carried out a diligent study for the purpose of solving the problem described above. As a result, the present inventors have found that, in a positive electrode active material composed of a lithium-containing composite oxide, a central portion of the lithium-containing composite oxide having a predetermined composition, a predetermined element is introduced into a surface layer region of a particle of the lithium-containing composite oxide, and the resultant product is combined with a sulfide solid electrolyte containing sulfur and phosphorus, whereby the above problem can be solved, and they have completed the present invention.

That is, according to one aspect of the present invention, there is provided a secondary battery including a power generating element, the power generating element including:

a positive electrode which includes a positive electrode active material layer containing a positive electrode active material composed of a lithium-containing composite oxide, the lithium-containing composite oxide including a central portion having a composition represented by the following chemical formula (1):

$$Li_{1+q}Ni_xCo_yMn_zM_pO_2 \quad (1)$$

where $-0.02 \leq q \leq 0.20$, $x+y+z+p=1$, $0.5 \leq x \leq 1.0$, $0 \leq y \leq 0.5$, $0 \leq z \leq 0.5$, $0 \leq p \leq 0.1$, and M is one or more elements selected from the group consisting of Ti, Zr, Nb, W, P, Al, Mg, V, Ca, Sr and Cr;

a solid electrolyte layer which contains a sulfide solid electrolyte containing sulfur and phosphorus; and a negative electrode which includes a negative electrode active material layer containing a negative electrode active material, the positive electrode, the solid electrolyte layer, and the negative electrode being laminated in this order, in which one or more added element selected from the group consisting of B, P, S and Si is made to be present in a molar concentration larger than that of Ni, into a surface layer region having a depth within 100 nm from the surface of a particle of the lithium-containing composite oxide.

According to the present invention, the initial capacity and cycle durability of a secondary battery which uses a sulfide solid electrolyte containing sulfur and phosphorus and high nickel-type positive electrode active material can be sufficiently improved.

DETAILED DESCRIPTION

<<Secondary Battery>>

One aspect of the present invention is a secondary battery including a power generating element, the power generating element including: a positive electrode which contains a positive electrode active material composed of a lithium-containing composite oxide, the lithium-containing composite oxide including a central portion having a composition represented by the following chemical formula (1):

$$Li_{1+q}Ni_xCo_yMn_zM_pO_2 \quad (1)$$

wherein $-0.02 \le q \le 0.20$, $x+y+z+p=1$, $0.5 \le x \le 1.0$, $0 \le y \le 0.5$, $0 \le z \le 0.5$, $0 \le p \le 0.1$, and M is one or more elements selected from the group consisting of Ti, Zr, Nb, W, P, Al, Mg, V, Ca, Sr and Cr; a solid electrolyte layer which contains a sulfide solid electrolyte containing sulfur and phosphorus; and a negative electrode which contains a negative electrode active material.

The positive electrode, the solid electrolyte layer, and the negative electrode are laminated in this order, and one or more added element selected from the group consisting of B, P, S and Si is made to be present in a molar concentration larger than that of Ni, into a surface layer region having a depth within 100 nm from the surface of a particle of the lithium-containing composite oxide.

Hereinafter, the embodiments of the present aspect described above will be described with reference to the drawings, but the technical scope of the present invention should be determined based on the description of the claims, and is not limited to the following embodiments. The dimensional ratios of the drawings are exaggerated for convenience of description and may differ from the actual ratios.

Figure 1:
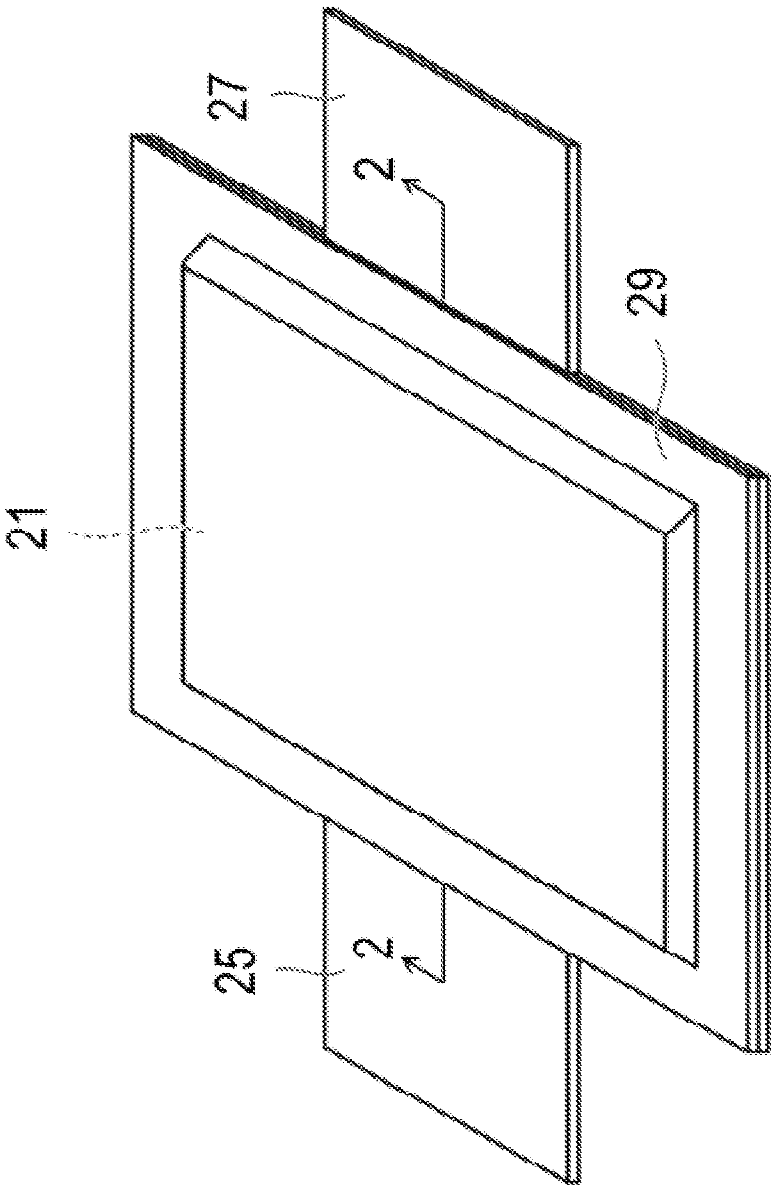
FIG. 1 is a perspective view illustrating an appearance of a flat laminate type all-solid lithium-ion secondary battery as one embodiment of a lithium-ion secondary battery according to the present invention.
Figure 2:
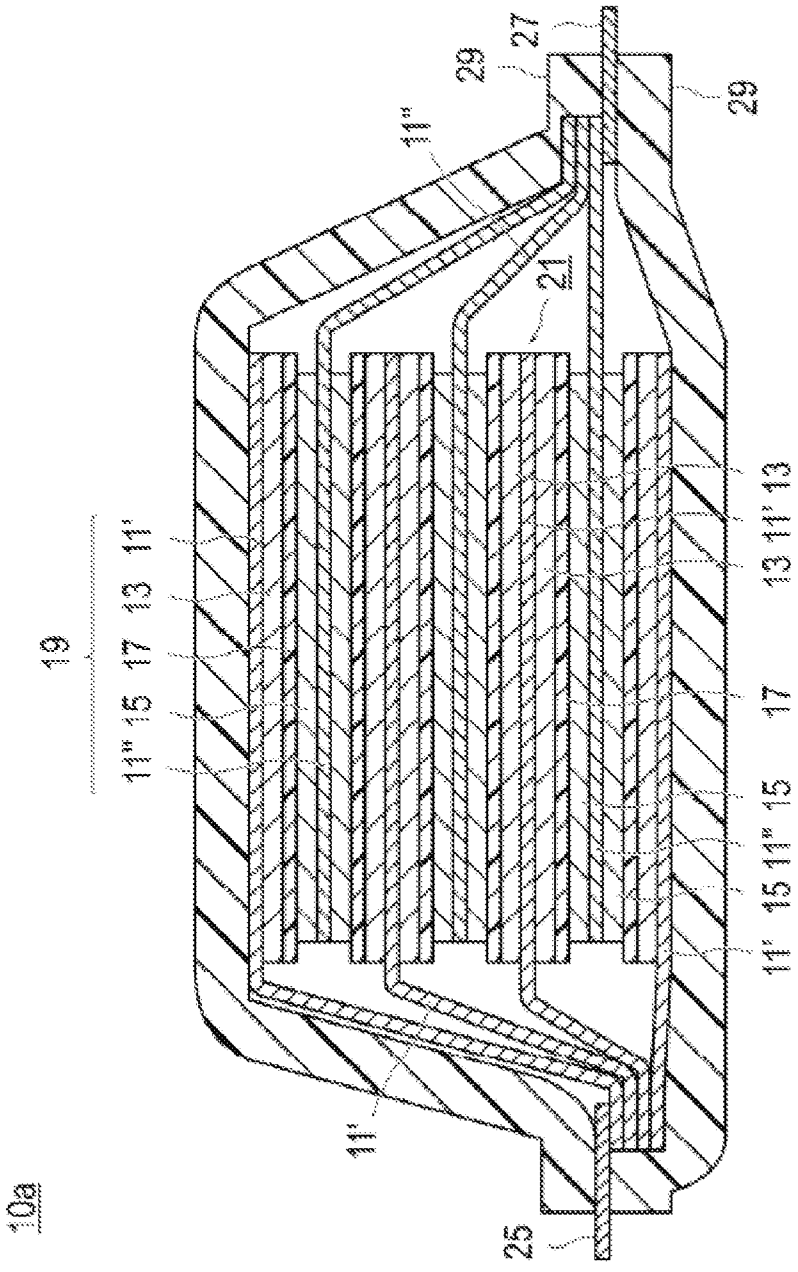
FIG. 2 is a cross-sectional view taken along line 2-2 illustrated in FIG. 1.

FIG. 1 is a perspective view illustrating an appearance of a flat laminate type all-solid lithium-ion secondary battery as one embodiment of a lithium-ion secondary battery according to the present invention. FIG. 2 is a cross-sectional view taken along line 2-2 illustrated in FIG. 1. The battery is formed into the laminate type, thereby allowing the battery to be compact and have a high capacity. In the present specification, the embodiment will be described by taking, as an example, a case where a secondary battery is a flat laminate type (non-bipolar type) lithium-ion secondary battery illustrated in FIGS. 1 and 2 (hereinafter also simply referred to as "laminate type battery"). However, in the case of viewing the present invention in an electric connection form (electrode structure) in the lithium-ion secondary battery according to the present aspect, the present invention can be applied to both a non-bipolar type (internal parallel connection type) battery and a bipolar type (internal serial connection type) battery.

As illustrated in FIG. 1, a laminate type battery **10*a* has a rectangular flat shape, and a negative electrode current collecting plate 25 and a positive electrode current collecting plate 27 for extracting electric power are extended from both sides of the battery. A power generating element 21 is wrapped in a battery outer casing material (laminate film 29) of the laminate type battery 10*a*, and the periphery of the battery outer casing material is heat-sealed, and the power generating element 21 is hermetically sealed in a state where the negative electrode current collecting plate 25 and the positive electrode current collecting plate 27** are extended to the outside.

The lithium-ion secondary battery according to the present aspect is not limited to a laminate type flat shape. A wound type lithium ion secondary battery is not particularly limited, and may have a cylindrical shape, or may have a rectangular flat shape obtained by deforming such a cylindrical shape. As for the lithium-ion secondary battery having the cylindrical shape, a laminate film may be used or a conventional cylindrical can (metal can) may be used as an outer casing material thereof, and the outer casing material is not particularly limited. Preferably, a power-generating element is housed in a laminate film including aluminum. According to this form, weight reduction can be achieved.

In addition, the extending of the current collecting plates (25 and 27) illustrated in FIG. 1 is also not particularly limited. The negative electrode current collecting plate 25 and the positive electrode current collecting plate 27 may be extended from the same side, or each of the negative electrode current collecting plate 25 and the positive electrode current collecting plate 27 may be divided into a plurality of pieces and extended from each side, and the extending is not limited to that illustrated in FIG. 1. In addition, in a wound type lithium-ion battery, for example, terminals may be formed by using a cylindrical can (metal can) instead of a tab.

As illustrated in FIG. 2, the laminate type battery **10*a* of the present embodiment has a structure in which the flat and substantially rectangular power-generating element 21 in which a charge and discharge reaction actually proceeds is sealed inside the laminate film 29 as the battery outer casing material. Here, the power-generating element 21 has a configuration in which a positive electrode, a solid electrolyte layer 17, and a negative electrode are laminated. The positive electrode has a structure in which a positive electrode active material layer 15 containing a positive electrode active material is disposed on both surfaces of a positive electrode current collector 11". The negative electrode has a structure in which a negative electrode active material layer 13 containing a negative electrode active material is disposed on both surfaces of a negative electrode current collector 11'. Specifically, the positive electrode, the solid electrolyte layer, and the negative electrode are laminated such that one positive electrode active material layer 15 and the negative electrode active material layer 13 adjacent thereto face each other with the solid electrolyte layer 17 interposed therebetween. Thus, the positive electrode, solid electrolyte layer, and negative electrode that are adjacent constitute one single battery layer 19. Therefore, it can be said that the laminate type battery 10*a* illustrated in FIG. 1 has a configuration in which a plurality of single battery layers 19** is laminated to be electrically connected in parallel.

As illustrated in FIG. 2, although the positive electrode active material layer 15 is disposed on only one surface of each of outermost positive electrode current collectors located in both outermost layers of the power-generating element 21, the active material layer may be provided on both surfaces. In other words, instead of using a current collector exclusively for an outermost layer provided with the active material layer only on one surface thereof, a current collector provided with the active material layer on both surfaces thereof may be used as it is as an outermost current collector. In some cases, the negative electrode active material layer 13 and the positive electrode active material layer 15 may be used as the negative electrode and the positive electrode, respectively, without using the current collectors (11' and 11").

The negative electrode current collector 11' and the positive electrode current collector 11" have a structure in which a negative electrode current collecting plate (tab) 25 and a positive electrode current collecting plate (tab) 27 which are electrically connected to the respective electrodes (the positive electrode and the negative electrode) are respectively attached to the negative electrode current collector 11' and the positive electrode current collector 11" and are led to an outside of the laminate film 29 so as to be sandwiched between ends of the laminate film 29 as the outer casing material. The positive electrode current collecting plate 27 and the negative electrode current collecting plate 25 may be attached to the positive electrode current collector 11" and the negative electrode current collector 11' of the respective electrodes with a positive electrode lead and a negative electrode lead (not illustrated) interposed therebetween, respectively by ultrasonic welding, resistance welding, or the like as necessary.

Hereinafter, main constituent members of the lithium-ion secondary battery according to the present aspect is applied will be described.

[Current Collector]

A current collector has a function of mediating transfer of electrons from electrode active material layers. A material constituting the current collector is not particularly limited. As the material constituting the current collector, for example, a metal or a resin having conductivity can be adopted.

Specific examples of the metal include aluminum, nickel, iron, stainless steel, titanium, copper, and the like. In addition to these, a clad material of nickel and aluminum, a clad material of copper and aluminum, or the like may be used. Further, a foil in which a metal surface is coated with aluminum may be used. Above all, aluminum, stainless steel, copper, and nickel are preferred from the viewpoint of the electron conductivity, the battery operating potential, the adhesion of the negative electrode active material by sputtering to the current collector, and the like.

Examples of the latter resin having conductivity include a resin obtained by adding a conductive filler to a non-conductive polymer material as necessary.

Examples of the non-conductive polymer material include polyethylene (PE; high density polyethylene (HDPE), low density polyethylene (LDPE), and the like), polypropylene (PP), polyethylene terephthalate (PET), polyether nitrile (PEN), polyimide (PI), polyamide imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), polystyrene (PS), and the like. Such a non-conductive polymer material can have excellent potential resistance or solvent resistance.

A conductive filler may be added to the conductive polymer material or the non-conductive polymer material as necessary. Particularly, in a case where a resin serving as a base material of the current collector is composed only of a non-conductive polymer, a conductive filler is essential to impart conductivity to the resin.

The conductive filler can be used without particular limitation as long as the conductive filler is a substance having conductivity. Examples of materials excellent in conductivity, potential resistance, or lithium-ion blocking property include metals and conductive carbon. Examples of the metals are not particularly limited, but preferably include at least one metal selected from the group consisting of Ni, Ti, Al, Cu, Pt, Fe, Cr, Sn, Zn, In, and Sb, or an alloy or a metal oxide containing these metals. The conductive carbon is not particularly limited. Preferably, examples of the conductive carbon include at least one selected from the group consisting of acetylene black, Vulcan (registered trademark), Black Pearl (registered trademark), carbon nanofiber, Ketjen black (registered trademark), carbon nanotube, carbon nanohorn, carbon nanoballoon, and fullerene.

The addition amount of the conductive filler is not particularly limited as long as sufficient conductivity can be imparted to the current collector, and is generally 5 to 80 mass % with respect to a total mass of 100 mass % of the current collector.

The current collector may have a single-layer structure made of a single material, or may have a laminated structure in which layers made of these materials are appropriately combined. From the viewpoint of weight reduction of the current collector, it is preferable that the current collector includes at least a conductive resin layer made of a resin having conductivity. From the viewpoint of blocking the movement of lithium ions between single battery layers, a metal layer may be provided in a part of the current collector. Further, as long as a negative electrode active material layer and a positive electrode active material layer to be described later have conductivity by themselves and can have a current collecting function, a current collector as a member different from these electrode active material layers is not necessarily used. In such an embodiment, the negative electrode active material layer described later as it is constitutes a negative electrode, and the positive electrode active material layer described later as it is constitutes a positive electrode.

[Negative Electrode (Negative Electrode Active Material Layer)]

In the secondary battery according to the present aspect, the negative electrode active material layer 13 contains a negative electrode active material. The type of the negative electrode active material is not particularly limited, and examples thereof include a carbon material, a metal oxide, and a metal active material. Examples of the carbon material include natural graphite, artificial graphite, mesocarbon microbead (MCMB), highly oriented graphite (HOPG), hard carbon, soft carbon, and the like. Examples of the metal oxide include $Nb_2O_5$, $Li_4Ti_5O_{12}$, and the like. Further, a silicon-based negative electrode active material or a tin-based negative electrode active material may be used. Here, silicon and tin belong to a Group 14 element, and are known to be a negative electrode active material that can greatly improve the capacity of a non-aqueous electrolyte secondary battery. Since simple substances of silicon and tin can occlude and release a large number of charge carriers (lithium ions and the like) per unit volume (mass), they become a high-capacity negative electrode active material. Here, a Si simple substance is preferably used as the silicon-based negative electrode active material. Similarly, it is also preferable to use a silicon oxide such as $SiO_x$ ($0.3 \leq x \leq 1.6$) disproportionated into two phases: a Si phase and a silicon oxide phase. At this time, the range of x is more preferably $0.5 \leq x \leq 1.5$, and still more preferably $0.7 \leq x \leq 1.2$. Further, an alloy containing silicon (silicon-containing alloy-based negative electrode active material) may be used.

Meanwhile, examples of the negative electrode active material containing a tin element (tin-based negative electrode active material) include a Sn simple substance, a tin alloy (a Cu—Sn alloy and a Co—Sn alloy), an amorphous tin oxide, a tin silicon oxide, and the like. Among them, $SnB_{0.4}P_{0.6}O_{3.1}$ is exemplified as the amorphous tin oxide. In addition, $SnSiO_3$ is exemplified as the tin silicon oxide. As the negative electrode active material, a metal containing lithium may be used. Such a negative electrode active material is not particularly limited as long as it is an active material containing lithium, and examples thereof include lithium-containing alloys in addition to metal lithium. Examples of the lithium-containing alloys include an alloy of Li and at least one of In, Al, Si, and Sn. In some cases, two or more kinds of negative electrode active materials may be used in combination. Needless to say, a negative electrode active material other than the above-described negative electrode active materials may be used. The negative electrode active material preferably contains metal lithium, a silicon-based negative electrode active material, or a tin-based negative electrode active material, and particularly preferably contains metal lithium.

Examples of a shape of the negative electrode active material include a particle shape (a spherical shape, a fibrous shape), a thin film shape, and the like. In a case where the negative electrode active material has a particle shape, for example, the average particle diameter ($D_{50}$) of the particles is preferably within a range of 1 nm to 100 μm, more preferably within a range of 10 nm to 50 μm, still more preferably within a range of 100 nm to 20 μm, and particularly preferably within a range of 1 to 20 μm. In the meantime, the value of the average particle diameter ($D_{50}$) of active materials can be measured by laser diffraction scattering method.

The content of the negative electrode active material in the negative electrode active material layer is not particularly limited, but for example, is preferably within a range of 40 to 99 mass %, and more preferably within a range of 50 to 90 mass %.

Preferably, the negative electrode active material layer further contains a solid electrolyte. When the negative electrode active material layer contains the solid electrolyte, the ion conductivity of the negative electrode active material layer can be improved. Examples of the solid electrolyte include a sulfide solid electrolyte and an oxide solid electrolyte, and a sulfide solid electrolyte is preferred.

Examples of the sulfide solid electrolyte include LiI—$Li_2S$—$SiS_2$, LiI—$Li_2S$—$P_2O_5$, LiI—$Li_3PO_4$—$P_2S_5$, $Li_2S$—$P_2S_5$, LiI—$Li_3PS_4$, LiI—LiBr—$Li_3PS_4$, $Li_3PS_4$, $Li_2S$—$P_2S_5$, $Li_2S$—$P_2S_5$—LiI, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are positive numbers, and Z is any of Ge, Zn, and Ga), $Li_2S$—$GeS_2$, $Li_2S$—$SiS_2$—$Li_3PO_4$, $Li_2S$—$SiS_2$—$Li_xMO_y$ (where x and y are positive numbers, and M is any of P, Si, Ge, B, Al, Ga, and In), and the like. The description of "$Li_2S$—$P_2S_5$" means a sulfide solid electrolyte obtained by using a raw material composition containing $Li_2S$ and $P_2S_5$, and the same applies to other descriptions.

The sulfide solid electrolyte may have, for example, a $Li_3PS_4$ skeleton, a $Li_4P_2S_7$ skeleton, or a $Li_4P_2S_6$ skeleton. Examples of the sulfide solid electrolyte having a $Li_3PS_4$ skeleton include LiI—$Li_3PS_4$, LiI—LiBr—$Li_3PS_4$, and $Li_3PS_4$. Examples of the sulfide solid electrolyte having a $Li_4P_2S_7$ skeleton include a Li—P—S-based solid electrolyte called LPS (e.g., $Li_7P_3S_{11}$). As the sulfide solid electrolyte, for example, LGPS expressed by $Li_{(4-x)}Ge_{(1-x)}P_xS_4$ (x satisfies $0<x<1$) or the like may be used. Above all, the sulfide solid electrolyte contained in the active material layer is preferably a sulfide solid electrolyte containing a P element, and the sulfide solid electrolyte is more preferably a material containing $Li_2S$—$P_2S_5$ as a main component. Furthermore, the sulfide solid electrolyte may contain halogen (F, Cl, Br, I).

In a case where the sulfide solid electrolyte is $Li_2S$—$P_2S_5$ based, a molar ratio of $Li_2S$ and $P_2S_5$ is preferably within a range of $Li_2S$:$P_2S_5$=50:50 to 100:0, and particularly preferably within a range of $Li_2S$:$P_2S_5$=70:30 to 80:20.

In addition, the sulfide solid electrolyte may be sulfide glass, may be crystallized sulfide glass, or may be a crystalline material obtained by a solid phase method. The sulfide glass can be obtained, for example, by performing mechanical milling (ball milling or the like) on a raw material composition. The crystallized sulfide glass can be obtained, for example, by heat-treating sulfide glass at a temperature equal to or higher than a crystallization temperature. In addition, ion conductivity (e.g., Li ion conductivity) of the sulfide solid electrolyte at a normal temperature (25° C.) is, for example, preferably $1\times10^{-5}$ S/cm or more, and more preferably $1\times10^{-4}$ S/cm or more. A value of the ion conductivity of the solid electrolyte can be measured by an AC impedance method.

Examples of the oxide solid electrolyte include a compound having a NASICON-type structure, and the like. Examples of the compound having a NASICON-type structure include a compound (LAGP) expressed by general formula: $Li_{1+x}Al_xGe_{2-x}(PO_4)_3$ ($0\le x\le2$), a compound (LATP) expressed by general formula: $Li_{1+x}Al_xTi_{2-x}(PO_4)_3$ ($0\le x\le2$), and the like. Other examples of the oxide solid electrolyte include LiLaTiO (e.g., $Li_{0.34}La_{0.51}TiO_3$), LiPON (e.g., $Li_{2.9}PO_{3.3}N_{0.46}$), LiLaZrO (e.g., $Li_7La_3Zr_2O_{12}$), and the like.

Examples of the shape of the solid electrolyte include particle shapes such as a perfectly spherical shape and an elliptically spherical shape, a thin film shape, and the like. When the solid electrolyte has a particle shape, the average particle diameter ($D_{50}$) is not particularly limited, but is preferably 40 μm or less, more preferably 20 μm or less, and still more preferably 10 μm or less. Meanwhile, the average particle diameter ($D_{50}$) is preferably 0.01 μm or more, and more preferably 0.1 μm or more.

The content of the solid electrolyte in the negative electrode active material layer is, for example, preferably within a range of 1 to 60 mass %, and more preferably within a range of 10 to 50 mass %.

The negative electrode active material layer may further contain at least one of a conductive aid and a binder in addition to the negative electrode active material and the solid electrolyte described above.

Examples of the conductive aid include, but are not limited to, metals such as aluminum, stainless steel (SUS), silver, gold, copper, and titanium, alloys or metal oxides containing these metals; carbon such as carbon fibers (specifically, vapor grown carbon fibers (VGCF), polyacrylonitrile-based carbon fibers, pitch-based carbon fibers, rayon-based carbon fibers, and activated carbon fibers), carbon nanotubes (CNT), and carbon black (specifically, acetylene black, Ketjen black (registered trademark), furnace black, channel black, thermal lamp black, and the like). In addition, a particle-shaped ceramic material or resin material coated with the metal material by plating or the like can also be used as the conductive aid. Among these conductive aids, the conductive aid preferably contains at least one selected from the group consisting of aluminum, stainless steel, silver, gold, copper, titanium, and carbon, more preferably contains at least one selected from the group consisting of aluminum, stainless steel, silver, gold, and carbon, and still more preferably contains at least one kind of carbon from the viewpoint of electrical stability. These conductive aids may be used singly or in combination of two or more kinds thereof.

The shape of the conductive aid is preferably a particle shape or a fibrous shape. In a case where the conductive aid has a particle shape, the shape of the particles is not particularly limited, and may be any shape such as a powder shape, a spherical shape, a rod shape, a needle shape, a plate shape, a columnar shape, an irregular shape, a scaly shape, and a spindle shape.

The average particle size (primary particle size) in the case in which the conductive aid is in a particulate form is not particularly limited; however, from the viewpoint of the electric characteristics of the battery, the average particle size is preferably about 0.01 to 10 μm. Incidentally, in the present specification, the "particle size of conductive aid" means the largest distance L among the distances between any arbitrary two points on the contour line of the conductive aid. Regarding the value of the "average particle size of conductive aid", a value calculated as an average value of the particle sizes of the particles observed in several to several dozen visual fields using an observation means such as a scanning electron microscope (SEM) or a transmission electron microscope (TEM) is to be employed.

In a case where the negative electrode active material layer contains a conductive aid, the content of the conductive aid in the negative electrode active material layer is not particularly limited, but is preferably in a range of 0 mass % to 10 mass %, more preferably in a range of 2 mass % to 8 mass %, and still more preferably in a range of 4 mass % to 7 mass % with respect to the total mass of the negative electrode active material layer. Within such ranges, a stronger electron conduction path can be formed in the negative electrode active material layer, and this can effectively contribute to improvement of battery characteristics.

Meanwhile, the binder is not particularly limited, and examples thereof include the following materials.

Polybutylene terephthalate, polyethylene terephthalate, polyvinylidene fluoride (PVDF) (including a compound in which a hydrogen atom is substituted with another halogen element), polyethylene, polypropylene, polymethylpentene, polybutene, polyether nitrile, polytetrafluoroethylene, polyacrylonitrile, polyimide, polyamide, an ethylene-vinyl acetate copolymer, polyvinyl chloride, styrene-butadiene rubber (SBR), an ethylene-propylene-diene copolymer, a styrene-butadiene-styrene block copolymer and a hydrogenated product thereof, a styrene-isoprene-styrene block copolymer and a hydrogenated product thereof; fluorine resins such as a tetrafluoroethylene-hexafluoropropylene copolymer (FEP), a tetrafluoroethylene-perfluoroalkylvinylether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF); and vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethylvinylether-tetrafluoroethylene-based fluorine rubber (VDF-PFMVE-TFE-based fluorine rubber), vinylidene fluoride-chlorotrifluoroethylene-based fluorine rubber (VDF-CTFE-based fluorine rubber); and epoxy resins are exemplified. Above all, polyimide, styrene-butadiene rubber, carboxymethylcellulose, polypropylene, polytetrafluoroethylene, polyacrylonitrile, and polyamide are more preferred.

The thickness of the negative electrode active material layer varies depending on the configuration of the intended secondary battery, but is preferably, for example, within a range of 0.1 to 1000 μm.

[Solid Electrolyte Layer]

In the secondary battery according to the present aspect, the solid electrolyte layer is interposed between the positive electrode active material layer and negative electrode active material layer described above and essentially contains a sulfide solid electrolyte containing sulfur and phosphorus.

The specific form of the sulfide solid electrolyte contained in the solid electrolyte layer is not particularly limited, and the sulfide solid electrolyte containing phosphorus exemplified in the section of the negative electrode active material layer can be similarly adopted. Specific examples of the sulfide solid electrolyte include $LiI—Li_2S—P_2O_5$, $LiI—Li_3PO_4—P_2S_5$, $Li_2S—P_2S_5$, $LiI—Li_3PS_4$, $LiI—LiBr—Li_3PS_4$, $Li_3PS_4$, $Li_2S—P_2S_5$, $Li_2S—P_2S_5—LiI$, $Li_2S—P_2S_5—Li_2O$, $Li_2S—P_2S_5—Li_2O—LiI$, $Li_2S—SiS_2—P_2S_5—LiI$, $Li_2S—P_2S_5—Z_mS_n$ (where m and n are positive numbers, and Z is any of Ge, Zn, and Ga.), $Li_2S—SiS_2—Li_3PO_4$, $LiI—Li_3PS_4$, $LiI—LiBr—Li_3PS_4$, $Li_3PS_4$, LPS (Li—P—S-based solid electrolyte (e.g., $Li_7P_3S_{11}$)), LGPS ($Li_{(4-x)}Ge_{(1-x)}P_xS_4$ (x satisfies $0<x<1$)), and the like. Above all, the sulfide solid electrolyte contained in the solid electrolyte layer is more preferably a material containing $Li_2S—P_2S_5$ as a main component. In some cases, a solid electrolyte other than the above-described sulfide solid electrolyte containing phosphorus may be used in combination. Here, a ratio of a content of the predetermined sulfide solid electrolyte mentioned above to a total of 100 mass % of the solid electrolyte is preferably 50 mass % or more, more preferably 70 mass % or more, still more preferably 80 mass % or more, yet still more preferably 90 mass % or more, particularly preferably 95 mass % or more, and most preferably 100 mass %.

The solid electrolyte layer may further contain a binder in addition to the predetermined sulfide solid electrolyte described above. As for the binder that can be contained in the solid electrolyte layer, the examples and preferred forms described in the section of the negative electrode active material layer can be similarly adopted.

The thickness of the solid electrolyte layer varies depending on the configuration of the intended lithium-ion secondary battery, but is preferably 600 μm or less, more preferably 500 μm or less, and still more preferably 400 μm or less from the viewpoint that the volume energy density of the battery can be improved. Meanwhile, the lower limit of the thickness of the solid electrolyte layer is not particularly limited, but is preferably 10 μm or more, more preferably 50 μm or more, and still more preferably 100 μm or more.

[Positive Electrode Active Material Layer]

In the secondary battery according to the present aspect, a positive electrode active material layer contains a so-called high nickel-type positive electrode active material. Specifically, the positive electrode active material contained in the positive electrode active material layer of the secondary battery according to the present aspect is composed of a lithium-containing composite oxide, the lithium-containing composite oxide including a central portion having a composition represented by the following chemical formula (1):

$$Li_{1+q}Ni_xCo_yMn_zM_pO_2 \quad (1)$$

where $-0.02 \leq q \leq 0.20$, $x+y+z+p=1$, $0.5 \leq x \leq 1.0$, $0 \leq y \leq 0.5$, $0 \leq z \leq 0.5$, $0 \leq p \leq 0.1$, and M is one or more elements selected from the group consisting of Ti, Zr, Nb, W, P, Al, Mg, V, Ca, Sr and Cr.

q in the formula (1) satisfies $-0.02 \leq q \leq 0.20$. q preferably satisfies $0 \leq q \leq 0.10$ from the viewpoint of increasing the initial discharge capacity. In the formula (1), x satisfies $0.50 \leq x \leq 1.0$. x preferably satisfies $0.50 \leq x \leq 1.0$, more preferably satisfies $0.55 \leq x \leq 0.95$, still more preferably satisfies $0.60 \leq x \leq 0.90$, and particularly preferably satisfies $0.70 \leq x \leq 0.85$ from the viewpoint of increasing the initial discharge capacity. y and z in the formula (1) satisfy $0 \leq (y, z) \leq 0.50$. From the viewpoint of excellent safety, y and z preferably satisfy $0 \leq (y, z) \leq 0.50$, more preferably satisfy $0.05 \leq (y, z) \leq 0.45$, and still more preferably satisfy $0.10 \leq (y, z) \leq 0.40$. x/z is preferably more than 1, more preferably 1.2 or more, and still more preferably in a range of 1.5 to 99.

One of the characteristics of the positive electrode active material according to the present aspect is that the composition of the surface layer region of the particle of the lithium-containing composite oxide constituting the positive electrode active material is different from the composition of the central portion represented by the formula (1) described above. Specifically, the positive electrode active material is characterized in that one or more added element selected from the group consisting of B, P, S and Si is made to be present in a molar concentration larger than that of Ni, into a surface layer region having a depth within 100 nm from the surface of a particle of the lithium-containing composite oxide including a central portion having a composition (formula (1)) as described above. In other words, as well as the Ni element, at least one element of B, P, S, or Si are made to be coexistent in a molar concentration larger than that of Ni, into the surface layer region. In the present invention, it is necessary that there are one or more of the added elements "present in a molar concentration larger than that of Ni, into the surface layer region". Therefore, in a case where the molar concentration of any added element in the surface layer region is equal to or less than the molar concentration of the Ni element, even when the total molar concentration of a plurality of added elements is larger than the molar concentration of the Ni element, this case is not included in the scope of the present invention.

The composition of elements in a surface layer region having a depth within 100 nm from the surface of a particle of the lithium-containing composite oxide can be analyzed using X-ray photoelectron spectroscopy (XPS). Further, the composition of the central portion of the lithium-containing composite oxide described above can be similarly analyzed by XPS. In the XPS measurement, correction is performed so as to shift the peak top of C1s to 284.6 [eV] as charge correction.

The concentration (amount) of the added element in the surface layer region is not particularly limited, but the concentration of the added element is preferably in a range of 1 to 30 mol %, and more preferably a range of 17 to 30 mol % in terms of a mole percentage with respect to all the elements in the surface layer region. Here, the concentration of the added element when a plurality of added elements is present in the surface layer region is the total concentration of the plurality of added elements. Further, the profile of the concentration change of the added element in the depth direction in the surface layer region is not particularly limited, and may be, for example, an inclined profile in which the concentration of the added element is gradually decreased from the surface toward the depth direction. Furthermore, the profile may be a profile in which the concentration of the added element is once increased from the surface toward the depth direction and then decreased, or may be a profile in which the concentration of the added element in the depth direction of the surface layer region is approximately uniform and the concentration of the added element is rapidly decreased on the way toward the central portion.

Here, as described above, the added elements as well as the Ni element are also essentially present in the surface layer region. When $y>0$ or $z>0$ in the formula (1), a Mn element or a Co element is similarly present. This means that the added elements are penetrated (doped) so as to be present into the surface layer region of the lithium-containing composite oxide having the composition represented by the formula (1). In other words, the positive electrode active material according to the present aspect means that the surface of the lithium-containing composite oxide is not simply covered (coated) with a substance containing an added element. The concentration (amount) of the Ni element in the surface layer region is also not particularly limited, but the concentration of the Ni element is preferably less than 10 mol %, and more preferably in a range of 2 to 7 mol % in terms of a mole percentage with respect to all the elements in the surface layer region. Further, the ratio (0/Ni) of the concentration of O (oxygen) to the concentration of Ni in the surface layer region is also not particularly limited, but is preferably 20.0 or less, and more preferably in a range of 2.9 to 20.0 from the viewpoint of further exhibiting the action and effect of the present invention.

The positive electrode active material used in the secondary battery according to the present aspect is a granulated product of the lithium-containing composite oxide having the above-described configuration. Here, the lithium-containing composite oxide according to the present aspect may be in the form of a monodispersed primary particle, or may be in the form of a secondary particle formed by aggregation of primary particles. However, from the viewpoint of further exhibiting the action and effect of the present invention, the lithium-containing composite oxide according to the present aspect is preferably in the form of a primary particle. For the same reason, the average particle diameter of the lithium-containing composite oxide particles according to the present aspect is preferably 10 μm or less, and more preferably in a range of 3.6 to 6.3 μm as a volume-based 50% cumulative diameter (D50) in a particle size distribution determined by a laser diffraction scattering method.

Here, the method for producing the positive electrode active material (lithium-containing composite oxide) having the above-described configuration according to the present aspect is not particularly limited, and there is appropriately referred to the conventionally known knowledge. Such a positive electrode active material (lithium-containing composite oxide) can be produced, for example, by a production method disclosed in JP 2020-35693 A or a method in which the production method is appropriately modified.

Here, the method for producing the positive electrode active material (lithium-containing composite oxide) disclosed in the publication will be briefly described. In this production method, first, an aqueous solution for nucleation containing: a solution of a transition metal raw material including one or more transition metal compounds; and an ammonium ion supplier is controlled to have a predetermined pH, a predetermined ammonium ion concentration, and a predetermined atmospheric oxygen concentration, and supplied to a crystallization reaction tank to form nuclei (nucleation step). Next, the nuclei formed in the nucleation step are subjected to particle growth (particle growth step). As a result, a transition metal composite hydroxide as a synthetic raw material of the lithium-containing composite oxide is obtained. Subsequently, the transition metal composite hydroxide obtained as described above is heat-treated (heat treatment step). Next, the heat-treated transition metal composite hydroxide and the lithium compound are mixed to form a lithium mixture (mixing step). Thereafter, the mixture formed in the mixing step is calcined (calcination step). Thus, a lithium-containing composite oxide is obtained. Here, in the production method disclosed in the publication, as the method for making an added element different from that of the present invention to be present into the surface layer of the transition metal composite hydroxide, disclosed are a method in which the transition metal composite hydroxide obtained above is slurried in an aqueous solution containing an added element (or an alkoxide solution of an added element), the aqueous solution is further added while controlling the pH to be a predetermined pH, and the added element is precipitated on the surface of the composite hydroxide by a crystallization reaction, and a method in which the transition metal composite hydroxide obtained above is sprayed with an aqueous solution or slurry containing an added element and dried. Furthermore, disclosed are a method for spray-drying a slurry in which the transition metal composite hydroxide and a salt containing an added element are suspended, a method for mixing the transition metal composite hydroxide and a salt containing an added element by a solid phase method, and the like. In producing the positive electrode active material (lithium-containing composite oxide) according to the present aspect, the same method can be adopted using the added elements (B, P, S, and Si) according to the present invention in place of the added element disclosed in the above publication.

Despite the positive electrode active material according to the present aspect is a so-called high nickel-type positive electrode active material, the positive electrode active material has the composition of the surface layer region described above, so that it is possible to sufficiently improve the initial discharge capacity and cycle durability of a secondary battery which uses a sulfide solid electrolyte containing sulfur and phosphorus. Although the mechanism in which such an effect is exerted by the configuration of the present invention is not completely clear, the following mechanism is estimated. That is, in the conventionally known high nickel-type positive electrode active material having the composition represented by the formula (1), the concentration of the Ni element in the surface layer region is also high similarly to the central portion, and a Ni atom and an oxygen atom form a metal-oxygen (Ni—O) bond in the surface layer region. This metal-oxygen bond is destabilized during charging, unlike a covalent bond, and is cleaved as the charging reaction proceeds. Meanwhile, the sulfide solid electrolyte containing sulfur and phosphorus is likely to cause an oxidation (bonding with oxygen) reaction due to contact with the positive electrode active material having a high potential (≥3 V (vs. lithium)), and the formation of active oxygen atoms by cleavage of the metal-oxygen bond in the positive electrode active material described above accelerates the progress of this oxidation reaction.

On the other hand, in the positive electrode active material according to the present aspect, the concentrations of the Ni element and the O element in the composition of the surface layer region are relatively decreased by the addition of the added element to the composition of the central portion. As a result, active oxygen atoms, which promote the oxidation reaction due to the contact of the predetermined sulfide solid electrolyte with the high-potential positive electrode active material, are less likely to be formed. Further, in the surface layer region, since the added elements (B, P, S, and Si) described above are covalently bonded to O atoms, they are electrochemically stable, which also acts in a direction of suppressing the formation of active oxygen atoms. As a result of these, it is considered that the progress of the oxidation reaction of the sulfide solid electrolyte associated with the progress of the charging reaction is prevented, and the effect of the present invention of improving the initial discharge capacity and cycle durability is exerted. Here, among the added elements, the added element: B (boron) is preferably present in the surface layer region from the viewpoint of further exhibiting the action and effect of the present invention. This is because the atomic radius of B (boron) is smaller than the rest of the added elements (P, S, and Si), and B as the added element present in the surface layer region is most unlikely to inhibit the insertion and extraction of lithium ions in the lithium-containing composite oxide. That is, when the added element is B (boron), an effect of improving output characteristics associated with a decrease in battery resistance (reaction resistance) is also obtained in addition to the action and effect of the present invention.

According to the study of the present inventors, it is found that the effect of the present invention is not exerted even by the above-mentioned technique described in Patent Literature 1 (WO 2013/022034 A). This is presumed to be because the reaction-inhibiting layer is peeled off due to the influence of expansion and shrinkage of the active material associated with charging and discharging, or application of a shear force during kneading in the slurry preparation step. Further, covering of the layer containing the lithium-containing oxide has a problem in principle that this acts in a direction of increasing the resistance to the conduction of lithium ions and electrons. Furthermore, since a step of separately providing a reaction-inhibiting layer is required, there is also a problem that the manufacturing cost increases.

In some cases, a positive electrode active material other than the lithium-containing composite oxide described above may be used in combination. Here, a ratio of a content of the predetermined lithium-containing composite oxide mentioned above to a total of 100 mass % of the positive electrode active material is preferably 50 mass % or more, more preferably 70 mass % or more, still more preferably 80 mass % or more, yet still more preferably 90 mass % or more, particularly preferably 95 mass % or more, and most preferably 100 mass %.

The content of the positive electrode active material in the positive electrode active material layer is not particularly limited, but is preferably within a range of 55 to 95 mass % from the viewpoint of preventing a decrease in energy density of the secondary battery. The positive electrode active material layer may further contain a conductive aid and/or a binder. As for specific and preferred forms of these materials, those described in the section of the negative electrode active material layer described above can be similarly adopted.

[Positive Electrode Current Collecting Plate and Negative Electrode Current Collecting Plate] A material constituting the current collecting plates (25 and 27) is not particularly limited, and a known highly conductive material conventionally used as a current collecting plate for a secondary battery can be used. As the material constituting the current collecting plates, for example, a metal material such as aluminum, copper, titanium, nickel, stainless steel (SUS), or an alloy thereof is preferred. From the viewpoint of weight reduction, corrosion resistance, and high conductivity, aluminum and copper are more preferred, and aluminum is particularly preferred. An identical material or different materials may be used for the positive electrode current collecting plate 27 and the negative electrode current collecting plate 25.

[Positive Electrode Lead and Negative Electrode Lead]

Although not illustrated, the current collector (11' or 11") and the current collecting plate (25 or 27) may be electrically connected with a positive electrode lead or a negative electrode lead interposed therebetween. As a material constituting the positive electrode lead and the negative electrode lead, a material used in a known lithium-ion secondary battery can be similarly adopted. The portion taken out from an outer casing is preferably covered with a heat resistant and insulating heat shrinkable tube or the like so as not to affect a product (e.g., an automotive component, particularly an electronic device, or the like) due to electric leakage caused by contact with peripheral devices, wiring lines, or the like.

[Battery Outer Casing Material]

As the battery outer casing material, a known metal can case can be used, and a bag-shaped case using the aluminum-containing laminate film 29, which can cover a power-generating element as illustrated in FIGS. 1 and 2, can be used. As the laminate film, for example, a laminate film or the like having a three-layer structure formed by laminating PP, aluminum, and nylon can be used, but the laminate film is not limited thereto. The laminate film is desirable from the viewpoint of high output and excellent cooling performance, and suitable application for batteries for large devices for EV and HEY. Further, from the perspective of easy adjustment of a group pressure applied to the power-generating element from an outside, the outer casing body is more preferably a laminate film containing aluminum.

The laminate type battery according to the present aspect has a configuration in which a plurality of single battery layers is connected in parallel, and thus has a high capacity and excellent cycle durability. Therefore, the laminate type battery according to the present aspect is suitably used as a power source for driving EV and HEV.

Although one embodiment of the lithium-ion secondary battery has been described above, the present invention is not limited to only the configurations described in the above-described embodiment, and can be appropriately changed based on the description of the claims.

The type of battery to which the lithium-ion secondary battery according to the present invention is applied, is for example, a bipolar type (bipolar type) battery including a bipolar electrode having a positive electrode active material layer electrically coupled to one surface of a current collector and a negative electrode active material layer electrically coupled to an opposite surface of the current collector.

Figure 3:
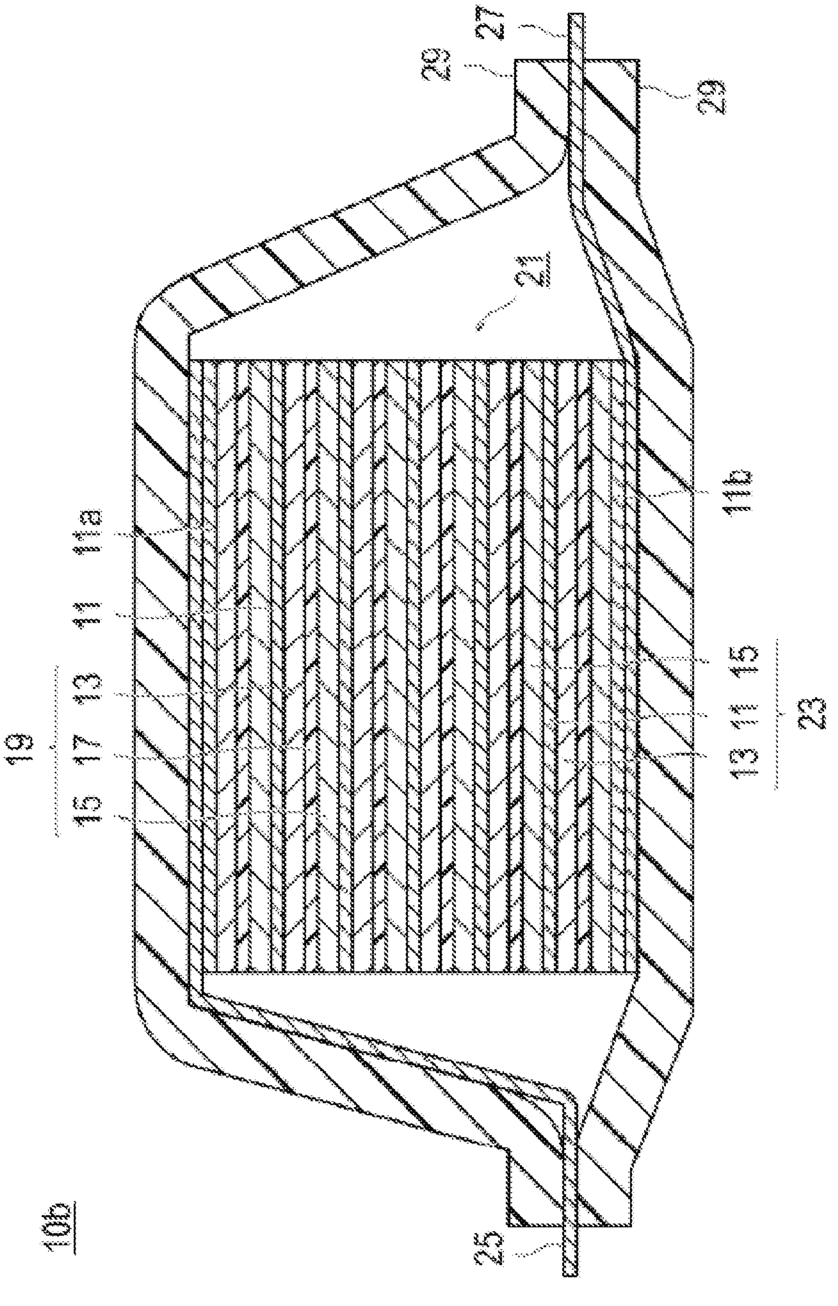
FIG. 3 is a cross-sectional view schematically illustrating a bipolar type all-solid lithium-ion secondary battery as one embodiment of the lithium-ion secondary battery according to the present invention.

FIG. 3 is a cross-sectional view schematically illustrating a bipolar type (bipolar type) lithium-ion secondary battery (hereinafter, also simply referred to as "bipolar battery") as one embodiment of the lithium-ion secondary battery according to the present invention. The bipolar battery **10*b* illustrated in FIG. 3 has a structure in which a substantially rectangular power-generating element 21 in which a charge and discharge reaction actually proceeds is sealed inside the laminate film 29** as the battery outer casing body.

As illustrated in FIG. 3, the power-generating element 21 of the bipolar battery **10*b* of the present embodiment has a plurality of bipolar type electrodes 23 in which the positive electrode active material layer 15 electrically coupled to one surface of a current collector 11 is formed, and the negative electrode active material layer 13 electrically coupled to an opposite surface of the current collector 11 is formed. The bipolar type electrodes 23 are laminated with the solid electrolyte layer 17 interposed therebetween to form the power-generating element 21. The solid electrolyte layer 17 has a configuration in which a solid electrolyte is formed in layers. As illustrated in FIG. 3, the solid electrolyte layer 17 is disposed to be sandwiched between the positive electrode active material layer 15 of one bipolar type electrode 23 and the negative electrode active material layer 13 of another bipolar type electrode 23 adjacent to the one bipolar type electrode 23**.

The positive electrode active material layer 15, the solid electrolyte layer 17, and the negative electrode active material layer 13 that are adjacent constitute one single battery layer 19. Therefore, it can also be said that the bipolar battery **10*b* has a configuration in which the single battery layers 19 are laminated. The positive electrode active material layer 15 is formed only on one surface of an outermost layer current collector 11*a* on the positive electrode side located in an outermost layer of the power-generating element 21. Further, the negative electrode active material layer 13 is formed only on one surface of an outermost layer current collector 11*b* on the negative electrode side located in an outermost layer of the power-generating element 21**.

Further, in the bipolar battery **10*b* illustrated in FIG. 3, a positive electrode current collecting plate (positive electrode tab) 25 is disposed so as to be adjacent to the outermost layer current collector 11*a* on the positive electrode side, and is extended to be led out from the laminate film 29 as the battery outer casing body. Meanwhile, the negative electrode current collecting plate (negative electrode tab) 27 is disposed so as to be adjacent to the outermost layer current collector 11*b* on the negative electrode side, and is similarly extended to be led out from the laminate film 29**.

The number of times of lamination of the single battery layers 19 is adjusted according to a desired voltage. Further, in the bipolar battery **10*b*, the number of times of lamination of the single battery layers 19 may be reduced as long as sufficient output can be secured even when the thickness of the battery is reduced as much as possible. Also, the bipolar battery 10*b* preferably has a structure in which the power-generating element 21 is sealed in the laminate film 29 as the battery outer casing body under reduced pressure, and the positive electrode current collecting plate 27 and the negative electrode current collecting plate 25 are extended to the outside of the laminate film 29** in order to prevent external impact and environmental deterioration during use.

Further, the secondary battery according to the present aspect need not be an all-solid type. Hence, the solid electrolyte layer may further contain a conventionally known liquid electrolyte (electrolyte solution). The amount of the liquid electrolyte (electrolyte solution) that can be contained in the solid electrolyte layer is not particularly limited, but is preferably such an amount that the shape of the solid electrolyte layer formed by the solid electrolyte is maintained and liquid leakage of the liquid electrolyte (electrolyte solution) does not occur.

The liquid electrolyte (electrolyte solution) that can be used has a form in which a lithium salt is dissolved in an organic solvent. Examples of the organic solvent to be used include dimethyl carbonate (DMC), diethyl carbonate (DEC), dipropyl carbonate (DPC), ethyl methyl carbonate (EMC), methyl propionate (MP), methyl acetate (MA), methyl formate (MF), 4-methyl dioxolane (4MeDOL), dioxolane (DOL), 2-methyltetrahydrofuran (2MeTHF), tetrahydrofuran (THF), dimethoxyethane (DME), propylene carbonate (PC), butylene carbonate (BC), dimethylsulfoxide (DMSO), γ-butyrolactone (GBL), and the like. Among all, the organic solvent is preferably chain carbonate, is more preferably at least one selected from the group consisting of diethyl carbonate (DEC), ethyl methyl carbonate (EMC), and dimethyl carbonate (DMC), and is more preferably selected from ethyl methyl carbonate (EMC) and dimethyl carbonate (DMC), from the viewpoint of further improving rapid charge characteristics and output characteristics.

Examples of the lithium salt include $Li(FSO_2)_2N$ (lithium bis(fluorosulfonyl)imide); LiFSI), $Li(C_2F_5SO_2)_2N$, $LiPF_6$, $LiBF_4$, $LiClO_4$, $LiAsF_6$, $LiCF_3SO_3$, and the like. Above all, the lithium salt is preferably $Li(FSO_2)_2N$(LiFSI) from the viewpoint of battery output and charge and discharge cycle characteristics.

The liquid electrolyte (electrolyte solution) may further contain an additive other than the components described above. Specific examples of such a compound include ethylene carbonate, vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylene carbonate, 1-methyl-1-vinylethylene carbonate, 1-methyl-2-vinylethylene carbonate, 1-ethyl-1-vinylethylene carbonate, 1-ethyl-2-vinylethylene carbonate, vinylvinylene carbonate, arylethylene carbonate, vinyloxymethylethylene carbonate, aryloxymethylethylene carbonate, acryloxymethylethylene carbonate, methacryloxymethylethylene carbonate, ethynylethylene carbonate, propargylethylene carbonate, ethynyloxymethylethylene carbonate, propargyloxyethylene carbonate, methylene ethylene carbonate, 1,1-dimethyl-2-methylene ethylene carbonate, and the like. These additives may be used singly or in combination of two or more kinds thereof. The amount of the additive used in the electrolyte solution can be appropriately adjusted.

[Assembled Battery]

An assembled battery is one configured by connecting a plurality of batteries. In detail, the assembled battery is one configured by serializing, parallelizing, or both serializing and parallelizing at least two or more batteries. It is possible to freely adjust the capacity and the voltage by serializing and parallelizing the batteries.

A plurality of batteries may be connected in series or in parallel to form an attachable and detachable compact assembled battery. Further, a plurality of such attachable and detachable compact assembled batteries may be connected in series or in parallel to form an assembled battery (such as a battery module or a battery pack) having a large capacity and a large output suitable for a power source for driving a vehicle and an auxiliary power source which require a high volume energy density and a high volume output density. How many batteries are connected to produce an assembled battery and how many stages of compact assembled batteries are laminated to produce a large-capacity assembled battery may be determined according to a battery capacity or output of a vehicle (electric vehicle) on which the assembled battery is to be mounted.

[Vehicle]

A battery or an assembled battery formed by combining a plurality of batteries can be mounted on a vehicle. In the present invention, a long-life battery having excellent long-term reliability can be configured, and thus mounting such a battery can provide a plug-in hybrid electric vehicle having a long EV traveling distance or an electric vehicle having a long one charge traveling distance. This is because a long-life and highly reliable automobile is provided when a battery or an assembled battery formed by combining a plurality of batteries is used, for example, for a hybrid vehicle, a fuel cell vehicle, or an electric vehicle (each encompasses a four-wheeled vehicle (a passenger car, a commercial car such as a truck or a bus, a light vehicle, and the like), a two-wheeled vehicle (motorcycle), and a three-wheeled vehicle) in the case of an automobile. However, the application is not limited to automobiles, and for example, the present invention can also be applied to various power sources of other vehicles, for example, movable bodies such as trains and can also be used as a mounting power source of an uninterruptible power system or the like.

EXAMPLES

Hereinbelow, the present invention will be described in more detail with reference to Examples. However, the technical scope of the present invention is not limited to the following Examples.

<Production Example of Test Cell>

Comparative Example 1

As a positive electrode active material, a lithium-containing composite oxide having a uniform composition of $LiNi_{0.8}Mn_{0.1}Co_{0.1}O_2$ and being in the form of a secondary particle as an aggregate of primary particles was provided. The average particle diameter (D50) of the lithium-containing composite oxide (secondary particles) was measured by the laser diffraction scattering method, and found to be 11.5 μm. Further, the composition of elements in a surface layer region having a depth within 100 nm from the surface of a particle of the lithium-containing composite oxide provided above was measured by X-ray photoelectron spectroscopy (XPS), and it was found that Ni accounted for 15 mol % and O accounted for 57 mol % of all the elements. The ratio (O/Ni) of the concentration of O (oxygen) to the concentration of Ni in the surface layer region, calculated from these values, was 3.8. In the XPS measurement, correction was performed so as to shift the peak top of C1s to 284.6 [eV] as charge correction.

Meanwhile, a lithium-ion conductive sulfide solid electrolyte containing sulfur and phosphorus: LPS ($Li_2S—P_2S_5$ (mixing ratio: 80:20 (mol %))) was provided as a solid electrolyte. Furthermore, acetylene black was provided as a conductive aid.

60 parts by mass of the positive electrode active material, 6 parts by mass of the conductive aid, and 34 parts by mass of the sulfide solid electrolyte as provided above were each weighed, and mixed using a table mill to prepare a positive electrode mixture.

Subsequently, LPS ($Li_2S—P_2S_5$ (mixing ratio: 80:20 (mol %))), which was the same sulfide solid electrolyte as described above, was placed in a jig (Macor tube), and press-molded at a molding pressure of 400 [MPa] to form a solid electrolyte layer (disk shape with a diameter of 10 mm and a thickness of 600 μm).

Next, the positive electrode mixture prepared above was put on one surface of the solid electrolyte layer produced above, and was press-molded at a molding pressure of 200 [MPa] to form a positive electrode active material layer (disk shape with a diameter of 10 mm and a thickness of 70 μm).

Thereafter, as a negative electrode, a Li—In electrode composed of a laminated body of a lithium metal foil (thickness: 100 μm) and an indium metal foil (thickness: 100 μm) was provided. Then, the Li—In electrode was disposed on the other surface of the solid electrolyte layer formed above such that the indium metal foil was located on the solid electrolyte layer side. Subsequently, the jig was fastened at a confining pressure of 100 [MPa], and a lead for extracting current was connected to each electrode to form a test cell of this Comparative Example.

Comparative Example 2

As a positive electrode active material, a lithium-containing composite oxide having a uniform composition of $LiNi_{0.8}Mn_{0.1}Co_{0.1}O_2$ and being in the form of a secondary particle as an aggregate of primary particles was provided. The average particle diameter (D50) of the lithium-containing composite oxide (secondary particles) was measured by the laser diffraction scattering method, and found to be 10.5 μm. Further, the composition of elements in a surface layer region having a depth within 100 nm from the surface of a particle of the lithium-containing composite oxide provided above was measured by X-ray photoelectron spectroscopy (XPS), and it was found that Ni accounted for 10 mol % and O accounted for 56 mol % of all the elements. The ratio (0/Ni) of the concentration of O (oxygen) to the concentration of Ni in the surface layer region, calculated from these values, was 5.6.

A test cell of this Comparative Example was produced in the same method as in Comparative Example 1 described above except that the lithium-containing composite oxide provided above was used as a positive electrode active material.

Comparative Example 3

As a positive electrode active material, a lithium-containing composite oxide having a uniform composition of $LiNi_{0.8}Mn_{0.1}Co_{0.1}O_2$ and being in the form of a secondary particle as an aggregate of primary particles was provided. The average particle diameter (D50) of the lithium-containing composite oxide (secondary particles) was measured by the laser diffraction scattering method, and found to be 10.2 μm. Further, the composition of elements in a surface layer region having a depth within 100 nm from the surface of a particle of the lithium-containing composite oxide provided above was measured by X-ray photoelectron spectroscopy (XPS), and it was found that Ni accounted for 12 mol % and O accounted for 55 mol % of all the elements. The ratio (O/Ni) of the concentration of O (oxygen) to the concentration of Ni in the surface layer region, calculated from these values, was 4.6.

A test cell of this Comparative Example was produced in the same method as in Comparative Example 1 described above except that the lithium-containing composite oxide provided above was used as a positive electrode active material.

Comparative Example 4

As a positive electrode active material, a lithium-containing composite oxide having a uniform composition of $LiNi_{0.8}Mn_{0.1}Co_{0.1}O_2$ and being in the form of a primary particle was provided. The average particle diameter (D50) of the lithium-containing composite oxide (primary particles) was measured by the laser diffraction scattering method, and found to be 4.5 μm. Further, the composition of elements in a surface layer region having a depth within 100 nm from the surface of a particle of the lithium-containing composite oxide provided above was measured by X-ray photoelectron spectroscopy (XPS), and it was found that Ni accounted for 13 mol % and O accounted for 60 mol % of all the elements. The ratio (0/Ni) of the concentration of O (oxygen) to the concentration of Ni in the surface layer region, calculated from these values, was 4.6.

A test cell of this Comparative Example was produced in the same method as in Comparative Example 1 described above except that the lithium-containing composite oxide provided above was used as a positive electrode active material.

Example 1

As a positive electrode active material, provided was a lithium-containing composite oxide in the form of a primary particle in which a central portion had a uniform composition of $LiNi_{0.8}Mn_{0.1}Co_{0.1}O_2$ and the surface layer region included B (boron). The average particle diameter (D50) of the lithium-containing composite oxide (primary particles) was measured by the laser diffraction scattering method, and found to be 3.6 μm. Further, the composition of elements in a surface layer region having a depth within 100 nm from the surface of a particle of the lithium-containing composite oxide provided above was measured by X-ray photoelectron spectroscopy (XPS), and it was found that Ni accounted for 5 mol %, 0 accounted for 36 mol %, and B accounted for 24 mol % of all the elements. The ratio (0/Ni) of the concentration of O (oxygen) to the concentration of Ni in the surface layer region, calculated from these values, was 7.2.

A test cell of this Example was produced in the same method as in Comparative Example 1 described above except that the lithium-containing composite oxide provided above was used as a positive electrode active material.

Example 2

As a positive electrode active material, provided was a lithium-containing composite oxide in the form of a primary particle in which a central portion had a uniform composition of $LiNi_{0.8}Mn_{0.1}Co_{0.1}O_2$ and the surface layer region included B (boron). The average particle diameter (D50) of the lithium-containing composite oxide (primary particles) was measured by the laser diffraction scattering method, and found to be 3.6 μm. Further, the composition of elements in a surface layer region having a depth within 100 nm from the surface of a particle of the lithium-containing composite oxide provided above was measured by X-ray photoelectron spectroscopy (XPS), and it was found that Ni accounted for 7 mol %, 0 accounted for 20 mol %, and B accounted for 30 mol % of all the elements. The ratio (0/Ni) of the concentration of O (oxygen) to the concentration of Ni in the surface layer region, calculated from these values, was 2.9.

A test cell of this Example was produced in the same method as in Comparative Example 1 described above except that the lithium-containing composite oxide provided above was used as a positive electrode active material.

Example 3

As a positive electrode active material, provided was a lithium-containing composite oxide in the form of a primary particle in which a central portion had a uniform composition of $LiNi_{0.8}Mn_{0.1}Co_{0.1}O_2$ and the surface layer region included B (boron). The average particle diameter (D50) of the lithium-containing composite oxide (primary particles) was measured by the laser diffraction scattering method, and found to be 4.3 μm. Further, the composition of elements in a surface layer region having a depth within 100 nm from the surface of a particle of the lithium-containing composite oxide provided above was measured by X-ray photoelectron spectroscopy (XPS), and it was found that Ni accounted for 2 mol %, 0 accounted for 40 mol %, and B accounted for 17 mol % of all the elements. The ratio (0/Ni) of the concentration of O (oxygen) to the concentration of Ni in the surface layer region, calculated from these values, was 20.0.

A test cell of this Example was produced in the same method as in Comparative Example 1 described above except that the lithium-containing composite oxide provided above was used as a positive electrode active material.

Example 4

As a positive electrode active material, provided was a lithium-containing composite oxide in the form of a primary particle in which a central portion had a uniform composition of $LiNi_{0.8}Mn_{0.1}Co_{0.1}O_2$ and the surface layer region included B (boron). The average particle diameter (D50) of the lithium-containing composite oxide (primary particles) was measured by the laser diffraction scattering method, and found to be 4.6 μm. Further, the composition of elements in a surface layer region having a depth within 100 nm from the surface of a particle of the lithium-containing composite oxide provided above was measured by X-ray photoelectron spectroscopy (XPS), and it was found that Ni accounted for 3 mol %, 0 accounted for 40 mol %, and B accounted for 17 mol % of all the elements. The ratio (O/Ni) of the concentration of O (oxygen) to the concentration of Ni in the surface layer region, calculated from these values, was 13.3.

A test cell of this Example was produced in the same method as in Comparative Example 1 described above except that the lithium-containing composite oxide provided above was used as a positive electrode active material.

Example 5

As a positive electrode active material, provided was a lithium-containing composite oxide in the form of a primary particle in which a central portion had a uniform composition of $LiNi_{0.8}Mn_{0.1}Co_{0.1}O_2$ and the surface layer region included B (boron). The average particle diameter (D50) of the lithium-containing composite oxide (primary particles) was measured by the laser diffraction scattering method, and found to be 3.6 μm. Further, the composition of elements in a surface layer region having a depth within 100 nm from the surface of a particle of the lithium-containing composite oxide provided above was measured by X-ray photoelectron spectroscopy (XPS), and it was found that Ni accounted for 3 mol %, 0 accounted for 57 mol %, and B accounted for 17 mol % of all the elements. The ratio (0/Ni) of the concentration of O (oxygen) to the concentration of Ni in the surface layer region, calculated from these values, was 19.0.

A test cell of this Example was produced in the same method as in Comparative Example 1 described above except that the lithium-containing composite oxide provided above was used as a positive electrode active material.

<Evaluation Example of Test Cell>

The discharge capacity per mass of the positive electrode active material was measured for the test cell formed in each of the Comparative Examples and Examples by the following method.

First, the test cell was sandwiched between 5-mm-thick stainless steel plates (two plates), and pressurized at a fastening pressure of 1000 $kgf/cm^2$ using a flat plate pressing machine with a hydraulic jack.

After a lapse of 1 hour after the pressurization, the test cell was placed in a thermostatic bath set at 25° C., and connected to a charge and discharge device to perform a charge and discharge test, and a charge and discharge capacity was measured. At this time, in the charging process, a current corresponding to 0.05 C was applied, and CC-CV charging was performed with an upper limit voltage of 3.6 V (vs. Li—In negative electrode). In addition, this charging process was ended after the current value decreased to a value corresponding to 0.01 C or after 40 hours elapsed from the start of charging. After completion of the charging process, the test cell was left for 1 hour, and then subjected to a discharging process. In the discharging process, CC discharging was performed at a current value corresponding to 0.05 C with a lower limit voltage of 1.9 V (vs. Li—In negative electrode). Then, the capacity (discharge capacity) was measured during the discharging process, the measured capacity was normalized by the mass of the positive electrode active material used in each test cell, and the discharge capacity per mass of the active material was calculated as the initial discharge capacity. The results are shown in Table 1 below.

In addition, the above-described charging and discharging processes were set as one cycle, and a total of 50 cycles of charging and discharging were performed. At this time, a downtime for leaving the test cell for 1 hour was also provided between the charging process and the discharging process. Then, as an index of cycle durability, the percentage of the discharge capacity at the 50th cycle to the initial discharge capacity was calculated as a capacity retention rate after 50 cycles. The results are shown in Table 1 below. In Comparative Example 1, since the initial discharge capacity had an extremely small value, the capacity retention rate was non-evaluable.

TABLE 1

| Examples/Comparative | Particle diameter D50 | Particle | Composition of surface layer region (XPS) | | | | Initial discharge capacity | Capacity retention rate after 50 cycles |
|---|---|---|---|---|---|---|---|---|
| Examples | [μm] | morphology | Ni [mol %] | O [mol %] | B [mol %] | O/Ni | [mAh/g] | [%] |
| Example 1 | 3.6 | Primary particle | 5 | 36 | 24 | 7 | 178 | 95 |
| Example 2 | 3.6 | Primary particle | 7 | 20 | 30 | 3 | 184 | 98 |
| Example 3 | 4.3 | Primary particle | 2 | 40 | 17 | 20 | 158 | 99 |

TABLE 1-continued

| Examples/Comparative Examples | Particle diameter D50 [μm] | Particle morphology | Composition of surface layer region (XPS) Ni [mol %] | O [mol %] | B [mol %] | O/Ni | Initial discharge capacity [mAh/g] | Capacity retention rate after 50 cycles [%] |
|---|---|---|---|---|---|---|---|---|
| Example 4 | 4.6 | Primary particle | 3 | 40 | 17 | 13 | 183 | 97 |
| Example 5 | 3.6 | Primary particle | 3 | 57 | 17 | 19 | 155 | 90 |
| Comparative Example 1 | 11.5 | Secondary particle | 15 | 57 | 0 | 4 | 5 | Non-evaluable |
| Comparative Example 2 | 10.5 | Secondary particle | 10 | 56 | 0 | 6 | 141 | 63 |
| Comparative Example 3 | 10.2 | Secondary particle | 12 | 55 | 0 | 5 | 114 | 74 |
| Comparative Example 4 | 4.5 | Primary particle | 13 | 60 | 0 | 5 | 150 | 52 |

From the results shown in Table 1, it is found that the initial capacity and cycle durability of a secondary battery which uses a sulfide solid electrolyte containing sulfur and phosphorus and high nickel-type positive electrode active material can be sufficiently improved by using a positive electrode active material composed of a lithium-containing composite oxide in which predetermined added elements are present in a surface layer region.

REFERENCE SIGNS LIST

10*a* Laminate type battery
10*b* Bipolar type battery
11 Current collector
11' Negative electrode current collector
11" Positive electrode current collector
13 Negative electrode active material layer
15 Positive electrode active material layer
17 Solid electrolyte layer
19 Single battery layer
21 Power generating element
25 Negative electrode current collecting plate
27 Positive electrode current collecting plate
29 Laminate film

The invention claimed is:

1. A secondary battery comprising a power generating element, the power generating element comprising:

a positive electrode which includes a positive electrode active material layer containing a positive electrode active material composed of a particle of a lithium-containing composite oxide, the particle of the lithium-containing composite oxide including a central portion having a composition represented by chemical formula (1):

$$Li_{1+q}Ni_xCo_yMn_zM_pO_2 \quad (1)$$

wherein −0.02≤q≤0.20, x+y+z+p=1, 0.5≤x≤1.0, 0≤y≤0.5, 0≤z≤0.5, 0≤p≤0.1, and M is one or more elements selected from the group consisting of Ti, Zr, Nb, W, P, Al, Mg, V, Ca, Sr and Cr;

a surface region of the particle of the lithium-containing composite oxide having a depth within 100 nm from a surface of the particle of the lithium-containing composite oxide;

a solid electrolyte layer which contains a sulfide solid electrolyte containing sulfur and phosphorus; and a negative electrode which includes a negative electrode active material layer containing a negative electrode active material, wherein the positive electrode, the solid electrolyte layer, and the negative electrode are laminated in this order, and one or more added element selected from the group consisting of B, S and Si is doped into the surface region of the particle such that the one or more added element is present in a molar concentration larger than that of Ni, and the Ni is present in the surface region.

2. The secondary battery according to claim 1, wherein an amount of Ni present in the surface region is in a range of 2 mol % to 7 mol %.

3. The secondary battery according to claim 1, wherein the added element includes B.

4. The secondary battery according to claim 1, wherein a concentration of Ni in the surface region is less than 10 mol %.

5. The secondary battery according to claim 1, wherein a ratio O mol %/Ni mol % of a concentration of O (oxygen) to the concentration of Ni in the surface region is 20.0 or less.

6. The secondary battery according to claim 1, wherein the lithium-containing composite oxide is in a form of a primary particle, and an average particle size (D50) of the lithium-containing composite oxide is 10 μm or less.

7. The secondary battery according to claim 1, wherein a ratio of a content of the positive electrode active material to a total of 100 mass % of a solid content of the positive electrode is in a range of 55 to 95 mass %.

8. The secondary battery according to claim 1, wherein 0.60≤x≤0.90 in the chemical formula (1).

9. The secondary battery according to claim 1, wherein the secondary battery is an all solid lithium-ion secondary battery.

10. A positive electrode active material for a secondary battery comprising a particle of a lithium-containing composite oxide, the lithium-containing composite oxide including a central portion having a composition represented by chemical formula (1):

$$Li_{1+q}Ni_xCo_yMn_zM_pO_2 \quad (1)$$

wherein −0.02≤q≤0.20, x+y+z+p=1, 0.5≤x≤1.0, 0≤y≤0.5, 0≤z≤0.5, 0≤p≤0.1, and M is one or more elements selected from the group consisting of Ti, Zr, Nb, W, P, Al, Mg, V, Ca, Sr and Cr;

wherein one or more added element selected from the group consisting of B, S and Si is doped into a surface region of the particle such that the one or more added element is present in a molar concentration larger than that of Ni, the surface region having a depth within 100 nm from a surface of the particle of the lithium-containing composite oxide, and the Ni is present in the surface region.

11. The secondary battery according to claim 10, wherein an amount of Ni present in the surface layer region is in a range of 2 to 7 mol %.

* * * * *